Patented Jan. 21, 1936

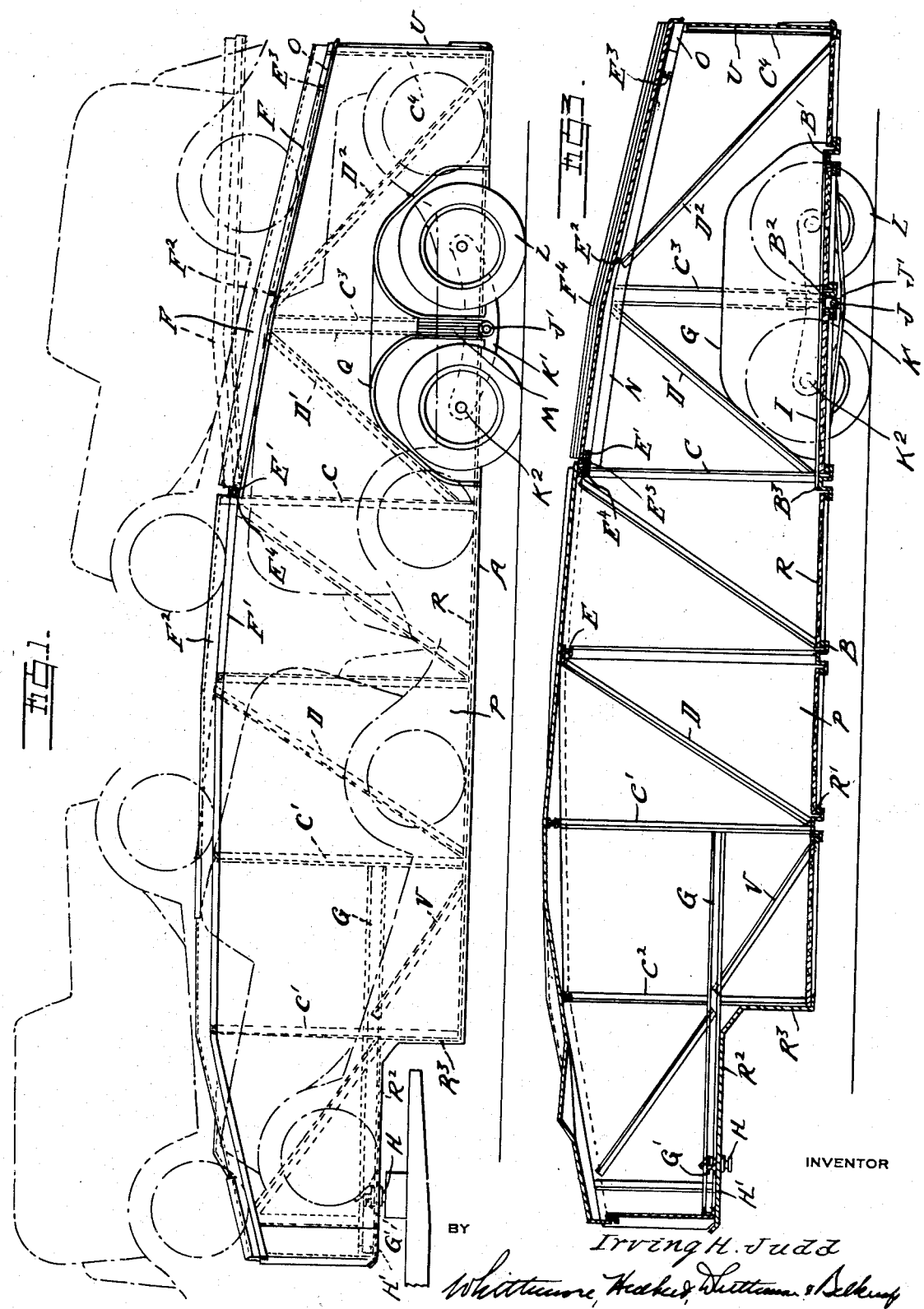

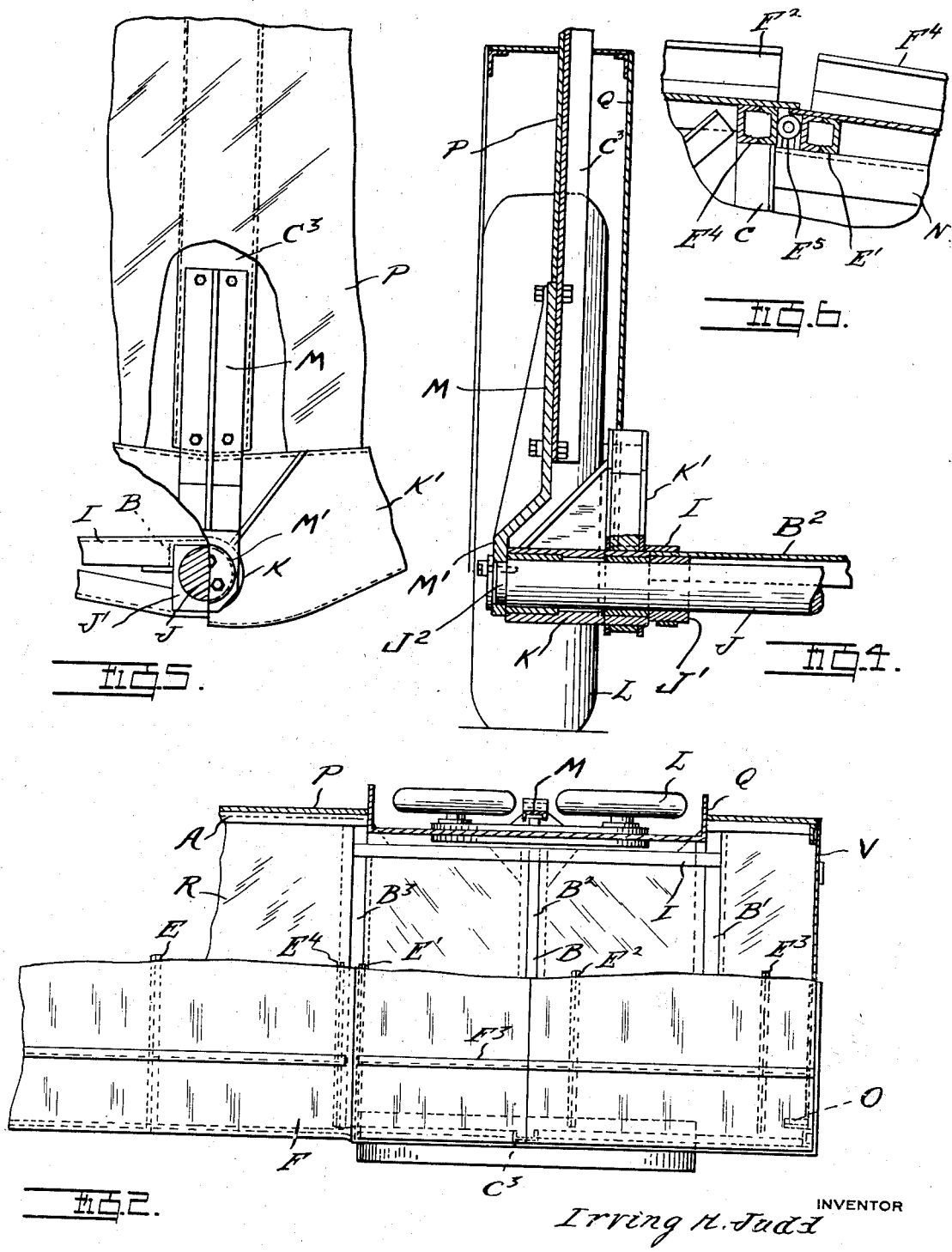

2,028,547

UNITED STATES PATENT OFFICE 2,028,547

AUTOMOBILE TRANSPORT

Irving H. Judd, Detroit, Mich., assignor to Whitehead & Kales Company, River Rouge, Mich., a corporation of Michigan Original application January 29, 1934, Serial No. 708,914. Divided and this application May 21, 1934, Serial No. 726,837

24 Claims. (Cl. 280—80)

This invention relates generally to automobile transports and constitutes a division of my application filed January 29, 1934, bearing Serial No. 708,914.

One of the essential objects of the invention is to provide a transport of this type having an improved walking beam running gear structure.

Another object is to provide a transport wherein the walking beam running gear structure embodies an improved mounting means.

Another object is to provide a transport wherein connections between the axle of the walking beam structure and the framework of the transport are provided upon both the outer and inner sides of the walking beams.

Another object is to provide a transport wherein the construction of the walking beam running gear structure and its mounting means is such that it is possible within an over-all limit in width to secure the maximum strength and efficiency and the maximum load carrying capacity as to number and size of automobiles to be transported.

Other objects, advantages and novel details of construction of this invention will be made more apparent as this description proceeds, especially when considered in connection with the accompanying drawings, wherein:

Figure 1 is a side elevation of my transport;

Figure 2 is a half top plan view thereof;

Figure 3 is a vertical central longitudinal section through the transport;

Figure 4 is a vertical cross section through one side of the vehicle in the plane of the axle;

Figure 5 is a side elevation of the portion shown in Figure 4;

Figure 6 is a vertical section through a portion of the vehicle showing the hinge for the track sections.

The frame of the transport is formed of angle bars, channel bars and other structural shapes and includes side sill members A preferably of angle cross section and cross members B of inverted channel cross section having outwardly extending base flanges. Rising from the side sills are posts C chiefly of angle section with suitable diagonal brace members D intermediate the same. At the top the posts C are cross connected by members E which as shown are formed of adjacent channel members forming in effect I-beams. Supported upon these cross members E at opposite sides of the frame are track members F preferably provided with downturned outer flanges F' and upturned inner flanges F² terminating in horizontally and inwardly projecting flanges F³. The greater portion of the length of the sills is arranged in a plane as low as possible consistent with proper road clearance, but at the forward end of the frame is an upwardly stepped portion for projecting over the near platform of the motor truck. This portion is preferably formed by the side channel bars G which are secured to two of the posts C', C² rising from the sills A and between these side bars is a cross bar G', preferably an I-beam. The king pin H for engaging with the so-called fifth wheel on the truck platform is centrally secured to this cross bar G' through the medium of a plate H'.

As has been stated, there is a limiting width dimension beyond which no part of the transport is permitted to extend. Therefore, instead of placing the supporting wheels outside of the side frames of the vehicle, I arrange such wheels in pockets within the sides. This necessitates interrupting the continuity of the side sills A for a sufficient distance to receive the supporting wheels, preferably a pair arranged in tandem. The forward and rear portions are then connected by members I which are arranged inside the wheels and connect the channel cross members B', B² and B³. J is an axle arranged within the channel of cross member B² and rigidly secured in bearing blocks J' which are also within the channel of the cross member and are welded thereto. Upon the projecting portion of this axle is sleeved the rockable bearing K for a walking beam K'. K² are stub axles projecting outwardly from the opposite ends of the walking beam K' and upon which the ground wheels L are journaled. The load of the vehicle is carried into the axle partly by the members I and chiefly through channel posts C³ which are secured to the ends of the axle by bracket members M having eyes M' engaging reduced portions J² of the axle. These posts C³ extend upward to the top of the frame where they are attached to longitudinal frame members N. There are also diagonal tie members D', D² on opposite sides of the post C³ extending downward to the sills. All of these frame members have their adjacent ends rigidly attached to each other, preferably by welding.

To obtain the most compact arrangement of the automobiles within the vertical space limits, they are reversed in position in the upper and lower tiers, the rear ends of those in the lower tier being adjacent to each other at the center of the transport. This permits of using the space between the sills A and the central portion of the top rails F for the rear or highest portion of the car. The end portions of the frame may be reduced in height as these are only required to clear the forward end portions of the automobiles, which gives a greater dimension for the rear ends of the cars in the upper tier. However, as the automobiles in the lower tier must be entered from the rear end, it is necessary to provide full clearance in height during such loading operation. This is accomplished by providing the rear portions of the track F with hinged sections $F^4$ which have full clearance height at their inner ends and are adapted to be raised at their outer ends during loading of the lower tier. These track sections $F^4$ are cross connected by members $E'$, $E^2$, $E^3$ and the forward cross member $E'$ is hinged at $E^5$ to the adjacent cross member $E^4$ connecting the posts C. The cross members $E'$ and $E^4$ are preferably formed of pairs of channels having their flanges welded to each other to form in effect box girders. The member $E'$ extends to rest upon the longitudinal rail N of the stationary frame which affords support for the load. Also the free ends of the track sections are supported by resting upon brackets O which are secured to the upper ends of the end posts $C^4$. Thus in normal position the load on this hinged section is carried directly into the stationary frame.

Preferably the frame is closed to form a weather-tight compartment suitable for carrying articles that would be damaged by exposure. Heretofore it has been usual to form the side walls of the enclosure by sheeting arranged on the inside of the frame, leaving the frame members exposed to view. With my improved construction I preferably place the side sheeting on the outside of the frame, thereby presenting a continuous surface which may be used for advertising matter. This outside sheeting P may be formed either of metal sheets, ply wood, or any other suitable material and serves efficiently to exclude the weather. When sheet metal is used for the siding, it also forms a structural element and acts the same as a plate girder construction to support the load. In case metal sheets are used, they may be welded to the sills A, posts C, $C'$, $C^2$, $C^3$ and $C^4$ and diagonal members D, $D'$ and $D^2$ of the frame and if more than one sheet is used to cover the side, the adjacent edges of adjacent sheets may be welded or otherwise suitably secured to each other. Where other material than metal is used, any suitable fasteners may be employed for securing the same to the frame. The recess in which the wheels L are arranged is formed by cutting away the side sheeting P and attaching a wheel housing Q to the margin of this cut away portion to complete the enclosure. The floor for the lower compartment is formed by floor boards R which are supported on the flanges $B^4$ on the cross members B, $B'$, etc., and strips $R'$ on these flanges raise the boards to have their upper surface flush with the top surface of the members B. The stepped portion at the front of the frame has a floor formed by a metal sheet $R^2$ which is secured to the lower side of the members G and $G'$ and which is provided with a flange $R^3$ which extends downwardly to meet the floor R.

With the construction as described, to load the transport the tail gate U thereof is turned down and the track sections $F^4$ are lifted into the position shown in dotted lines in Figure 1. One automobile is then driven into the rear end of the transport over a suitable incline (not shown) and the forward wheels are moved upward over in-clined track sections V to the level of the floor $R^2$ and on to said floor until arrested by contact with the I-beam $G'$. The top flange of this I beam is bent to form a downwardly inclined portion which contacts with the tires of the wheel and forms a stop therefor. After securing the car in this position, the second car is backed into the rear end of the transport to a position just clearing the rear end of the forward car. The track sections $F^4$ are then lowered upon the frame and the tail gate U is closed. In loading the top tier the vehicles may be driven on from either end over suitably inclined runways and are secured in the position shown in dotted lines. Thus when the transport is loaded the overhead limiting dimension is not exceeded.

What I claim as my invention is:

1. In a transport, a frame including a longitudinally extending member, a cross member, and an upright, an axle substantially parallel to the cross member, a walking beam sleeved freely on the axle upon the outer side of the longitudinally extending member, and a support for said axle carried by the upright upon the outer side of the walking beam and holding the walking beam against displacement relative to the longitudinally extending member aforesaid.

2. In a transport, a frame including a cross member and an upright, an axle substantially parallel to the cross member, a walking beam sleeved freely on the axle, a support for the axle carried by the cross member upon the inner side of said walking beam, and an additional support for the axle carried by the upright upon the outer side of the walking beam and cooperating with the support aforesaid to hold the walking beam in proper position relative to said frame.

3. In a transport, a frame including a cross member and an upright, an axle substantially parallel to the cross member, a walking beam sleeved freely on the axle, a support for the axle carried by the cross member upon the inner side of said walking beam, and means cooperating with said support for holding the walking beam in proper position relative to the frame, including a bracket fastened to the upright at a point above the walking beam and fastened to the axle upon the outer side of the walking beam.

4. A transport having a frame provided with a longitudinally extending member, a cross member, and an upright member, an axle substantially parallel to the cross member, a walking beam rockably mounted on the axle upon one side of the longitudinally extending member, and supports for the axle upon opposite sides of the walking beam and secured respectively to the upright member and cross member.

5. In a transport, a frame including a longitudinally extending member, a cross member, and an upright, a walking beam upon the outer side of the longitudinally extending member, a bearing member connected to the cross member, an axle extending through the bearing member and walking beam, and means connected to the upright and axle for holding the walking beam in proper position relative to said frame.

6. In a transport, a frame including a longitudinally extending member, a cross member, and an upright, an axle substantially parallel to the cross member, a walking beam sleeved on the axle upon the outer side of the longitudinally extending member, a support for the axle carried by the cross member upon the inner side of the walking beam, and a second support for the axle carried by the upright upon the outer side of the walking beam and cooperating with the support aforesaid to hold the walking beam in proper position relative to the frame.

7. An automobile transport having a frame including sills, cross members, and uprights, portions of said sills being removed to provide longitudinally extending spaces, the cross members being spaced apart and connected to said sills fore and aft of said spaces, the uprights being elevated relative to said sills and cross members, longitudinally extending members forming the inner sides of said spaces, said longitudinally extending members being spaced inwardly from said sills and connected to said cross members, walking beams upon the outer sides of said longitudinally extending members in the spaces aforesaid, ground-engaging wheels arranged in tandem at opposite ends of and connected to said walking beams, a cross bar connected to said longitudinally extending members, an axle extending longitudinally of said cross bar and terminally connected to said walking beams, the uprights aforesaid being in the vertical plane of but spaced from said axle, and connections between the axle and frame including means upon the inner and outer sides of said walking beams respectively connected to said cross bar and uprights.

8. An automobile transport comprising opposite pairs of tandem supporting wheels, a walking beam connecting each pair of wheels, an axle extending between said walking beams and pivotally connected therewith, sills having inwardly offset portions supported on said axle inside of said walking beams and wheels, the dimension between the offset portions of said sills being less than the dimension between the main portions of said sills, side frames mounted on said sills, and an additional support for each of said side frames engaging said axle outside of said walking beams.

9. An automobile transport comprising opposite pairs of tandem supporting wheels, a walking beam connecting each pair of wheels, an axle extending between and pivotally connected to said walking beams, a frame mounted on said axle providing a lower compartment for automobiles, said frame comprising side sills having inwardly off-set portions supported on said axle inside of said wheels and walking beams, the dimension between the offset portions of said sills being less than the dimension between the main portions of said sills, posts extending upward from said sills, posts supported on the outer ends of said axle, and brace connections between said posts whereby the load is carried into said axle partly through the post supported thereon and partly through the inwardly offset portions of the sills.

10. An automobile transport comprising opposite pairs of tandem supporting wheels, a walking beam connecting each pair of wheels, an axle extending between and pivotally connected to said walking beams, a frame supported on said axle providing a lower compartment for automobiles, said frame comprising side sills having inwardly off-set portions passing inside of said wheels and directly engaging the axle, the dimension between the offset portions of said sills being less than the dimension between the main portions of said sills, posts extending upward from said sills, posts in the same vertical plane directly above said axle, brackets secured to and depending from the latter posts having eyes at their lower ends for engaging the outer ends of said axle and bracing between said posts for carrying the load into said axle partly through said offset sills and partly through said brackets.

11. An automobile transport comprising opposite pairs of tandem supporting wheels, a walking beam connecting each pair of wheels, an axle extending between said walking beams and pivotally connected therewith, sills having inwardly off-set portions inside said wheels, the greater portion of said sills being spaced from each other more than the dimension between said offset portions, side frames mounted on said sills, and a support for each of said side frames engaging said axle outside of each walking beam.

12. An automobile transport comprising a frame, an axle extending transversely of said frame, walking beams sleeved upon said axle upon opposite sides of said frame, and a connection between said axle and frame holding said walking beams against lateral displacement relative to said frame.

13. An automobile transport comprising a horizontal frame, an axle extending transversely of said frame, walking beams sleeved upon said axle upon opposite sides of said frame, upright frames upon the horizontal frame including upright members above said axle upon the outer sides of said walking beams, and load transmitting connections between said axle and upright members upon the outer sides of said walking beams.

14. An automobile transport comprising a horizontal frame, an axle extending transversely of said frame, walking beams sleeved upon said axle upon opposite sides of said frame, upright side frames upon the horizontal frame and including upright members upon the outer sides of said walking beams above and in spaced relation to said axle, and connections between opposite ends of said axle and said upright members.

15. An automobile transport comprising a frame, an axle extending transversely of said frame, walking beams sleeved upon said axle upon opposite sides of said frame, upright side frames above the frame aforesaid and including upright members upon the outer sides of the walking beams above and in spaced relation to said axle, connections between said axle and first mentioned frame upon the inner sides of said walking beams, and connections between said axle and upright frame members upon the outer sides of said walking beams.

16. A transport having a frame provided with a longitudinally extending member, a cross member, and an upright member, an axle substantially parallel to the cross member, a walking beam rockably mounted on the axle upon one side of the longitudinally extending member, and a support for the axle upon the outer side of the walking beam, said support extending to and adapted to receive the load of the frame from said upright frame member.

17. In a transport, a frame including a cross member and an upright, an axle substantially parallel to the cross member, a walking beam sleeved freely on the axle, a connection between the axle and cross member holding the axle against displacement relative to said frame, a bracket fastened to the axle upon the outer side of said walking beam, and means connecting said bracket to said upright whereby the load is carried into said axle.

18. An automobile transport comprising opposite pairs of tandem supporting wheels, a walking beam upon the inner side and connecting each pair of wheels, an axle extending between said walking beams and pivotally connected therewith, sills having inwardly offset portions upon the inner sides of said walking beams, the greater portions of said sills being spaced from each other more than the dimension between said offset portions, side frames mounted on said sills, and a support for each of said side frames engaging said axle upon the outer side of each walking beam.

19. A transport having a frame provided with a longitudinally extending member, a cross member, and an upright member, an axle substantially parallel to the cross member, a walking beam rockably mounted on the axle upon one side of the longitudinally extending member, and a support upon the outer ends of the trailer axle to receive and transmit the vertical trailer load to the axle.

20. A transport having a longitudinally extending member and an upright member, an axle extending transversely of said longitudinally extending member, a walking beam rockably mounted on said axle upon one side of said longitudinally extending member, a connection between said axle and longitudinally extending member disposed upon the inner side of said walking beam, and a connection between said axle and upright member disposed upon the outer side of said walking beam.

21. An automobile transport having a horizontal frame, an axle extending transversely of said frame, a walking beam sleeved upon said axle upon one side of said frame, an upright frame upon the horizontal frame including an upright member above and in substantially vertical alignment with said axle, and a load transmitting connection between said axle and upright member upon one side of said walking beam.

22. In a transport, a frame having substantially horizontal and upright portions, an axle substantially parallel to the horizontal portion of said frame, a walking beam sleeved freely on the axle, a support for the axle carried by the horizontal portion of the frame upon the inner side of said walking beam, and means cooperating with said support for holding the walking beam in proper position relative to said frame, including a bracket fastened to the upright portion of the frame at a point above the walking beam and fastened to the axle upon the outer side of said walking beam.

23. A transport having a frame provided with a longitudinally extending member, a cross member connected to said longitudinally extending member, and an upright member spaced laterally outwardly from and slightly above the connection between said longitudinally extending member and said cross member, an axle substantially parallel to the cross member and projecting outwardly beyond one end thereof beneath the upright member, a walking beam rockably mounted on the axle between the longitudinally extending member and upright member, a connection between the axle and cross member holding the walking beam against shifting inwardly on the axle relative to the frame, and a connection between the axle and said upright member holding the walking beam against shifting outwardly on the axle relative to the frame and forming a load transmitting member from the upright member to the axle.

24. In a transport, a frame including a cross bar, an upright spaced laterally outwardly from and slightly above said cross bar, an axle substantially parallel to and projecting laterally beyond one end of said cross bar in vertically spaced relation to the upright, a longitudinally extending member rigid with the cross bar at the end aforesaid, a walking beam on the axle between the upright and longitudinally extending member, a connection between the axle and cross bar, and a separate connection between the axle and upright.

IRVING H. JUDD.